United States Patent

Georgis et al.

(10) Patent No.: US 8,587,696 B2
(45) Date of Patent: Nov. 19, 2013

(54) SUPER-RESOLUTION DIGITAL ZOOM

(71) Applicant: Sony Corporation, Tokyo (JP)

(72) Inventors: Nikolaos Georgis, San Diego, CA (US);
Fredrik Carpio, San Diego, CA (US);
Paul Jin Hwang, Solana beach, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 13/920,425

(22) Filed: Jun. 18, 2013

(65) Prior Publication Data

US 2013/0278604 A1    Oct. 24, 2013

Related U.S. Application Data

(63) Continuation of application No. 13/788,558, filed on Mar. 7, 2013, which is a continuation of application No. 12/165,285, filed on Jun. 30, 2008, now Pat. No. 8,477,217.

(51) Int. Cl.
*H04N 5/262* (2006.01)
*H04N 5/222* (2006.01)

(52) U.S. Cl.
USPC ............... 348/240.2; 348/222.1; 348/240.99; 348/239; 348/333.11

(58) Field of Classification Search
USPC .......... 348/222.1, 240.99, 240.2, 239, 333.11
See application file for complete search history.

(56) References Cited

U.S. PATENT DOCUMENTS

| | | | |
|---|---|---|---|
| 5,649,032 A * | 7/1997 | Burt et al. | 382/284 |
| 6,208,765 B1 * | 3/2001 | Bergen | 382/268 |
| 6,906,746 B2 * | 6/2005 | Hijishiri et al. | 348/240.2 |
| 7,218,751 B2 * | 5/2007 | Reed et al. | 382/100 |
| 8,081,220 B2 * | 12/2011 | Kawai | 348/208.12 |
| 2001/0012072 A1 * | 8/2001 | Ueno | 348/333.02 |
| 2002/0008765 A1 * | 1/2002 | Ejima et al. | 348/239 |
| 2002/0109781 A1 * | 8/2002 | Asada | 348/240.1 |
| 2004/0179749 A1 * | 9/2004 | Kato et al. | 382/284 |
| 2005/0012833 A1 * | 1/2005 | Yokota et al. | 348/240.99 |
| 2005/0212952 A1 * | 9/2005 | Triteyaprasert et al. | 348/345 |
| 2005/0248681 A1 * | 11/2005 | Nozaki et al. | 348/345 |
| 2005/0281550 A1 * | 12/2005 | Asada | 396/72 |
| 2006/0061672 A1 * | 3/2006 | Nitta | 348/239 |
| 2006/0290792 A1 * | 12/2006 | Nikkanen et al. | 348/240.2 |
| 2007/0019887 A1 * | 1/2007 | Nestares et al. | 382/299 |
| 2007/0257934 A1 * | 11/2007 | Doermann et al. | 345/606 |
| 2007/0263113 A1 * | 11/2007 | Baek et al. | 348/340 |
| 2008/0231742 A1 * | 9/2008 | Kurase | 348/333.01 |
| 2009/0009614 A1 * | 1/2009 | Kawai | 348/208.12 |
| 2012/0092525 A1 * | 4/2012 | Kusaka | 348/231.99 |
| 2012/0274813 A1 * | 11/2012 | Ishibashi | 348/239 |
| 2013/0027510 A1 * | 1/2013 | Tsubusaki | 348/36 |

* cited by examiner

*Primary Examiner* — Michael Osinski
(74) *Attorney, Agent, or Firm* — John L. Rogitz

(57) ABSTRACT

When a user selects digital zooming in a camera such as might be included in a wireless telephone or PDA, a series of images are automatically obtained and superimposed using super-resolution techniques to produce an improved digital zoom image transparently to the user.

6 Claims, 1 Drawing Sheet

SUPER-RESOLUTION DIGITAL ZOOM

FIELD OF THE INVENTION

The present invention relates generally to improving the image quality during digital zoom in cameras without optical zoom capability.

BACKGROUND OF THE INVENTION

Optical zooming in camera entails the translational moving of a lens to magnify the image. In less capable cameras such as those typically included in wireless telephones and personal digital assistants (PDAs), the lenses do not move. To provide for a zoom-like function, digital zooming is used in which, for example, a portion of the image is cropped and the remaining image simply enlarged to fill the image screen. As understood herein, white digital zooming simulates the magnification yielded by optical zooming, it reduces image quality compared to optical zooming.

SUMMARY OF THE INVENTION

A method includes receiving a user selection of digital zooming in a camera and in response automatically generating plural images. The images are digitally zoomed and then superimposed to produce an improved digital zoom image transparently to the user.

The superimposition may be undertaken using super-resolution. The camera can be incorporated into a wireless telephone or personal digital assistant (PDA) or other device that does not have optical zoom capability. If desired, prior to zooming the images a portion of each image can be removed to render respective cropped images, and the cropped images are digitally zoomed.

In another aspect, an apparatus includes an imager, a processor communicating with the imager to receive signals therefrom, and a computer readable medium accessible to the processor and bearing instructions. The instructions cause the processor, in response to a predetermined user command to generate at least two images automatically and digitally zoom each image to render a respective zoomed image. The instructions also cause the processor to superimpose the zoomed images on each other to render a modified zoomed image.

In still another aspect, an apparatus includes an imager, a display, and a processor configured to present on the display a modified digital zoom image including at least two superimposed images.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
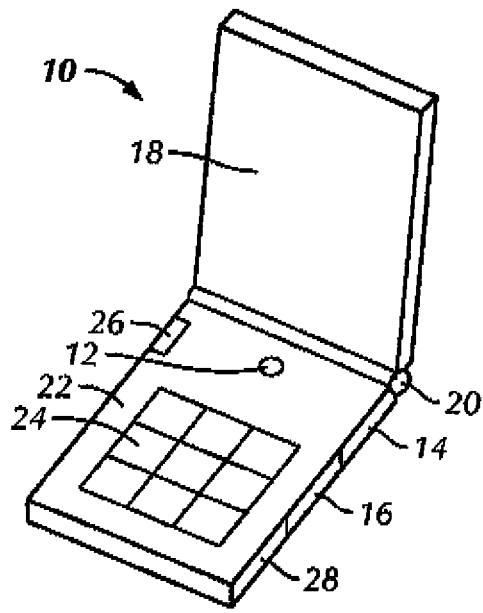
FIG. 1 is a perspective view of a non-limiting device that can incorporate present principles, with some components shown schematically.

Referring initially to FIG. 1, an apparatus is shown, generally designated 10, that can include an imager 12 such as a charge coupled device (CCD) and a processor 14 receiving image signals from the imager 12. The processor 14 can access a computer readable storage medium 16 such as but not limited to removable or non-removable solid state memory, disk memory, etc. The logic of FIG. 2 may be embodied as computer instructions on the medium 16 that are executable by the processor 14 to present a digitally zoomed image on a display 18 in accordance with principles set forth below.

The apparatus 10 may be embodied as a wireless telephone or personal digital assistant (PDA) or other portable device with a portable housing 20 in which, in one embodiment, the display 18 may be hingedly coupled to a base 22. The base 22 can be bear an input device 24 such as a telephone keypad, and one or more controls 26, both of which generate input signals to the processor 14 when manipulated. Among the user commands that can be input is a "digital zoom" command. The apparatus 10 may not have optical zoom capability. A wireless telephony receiver 28 may also be incorporated in the apparatus 10.

Figure 2:
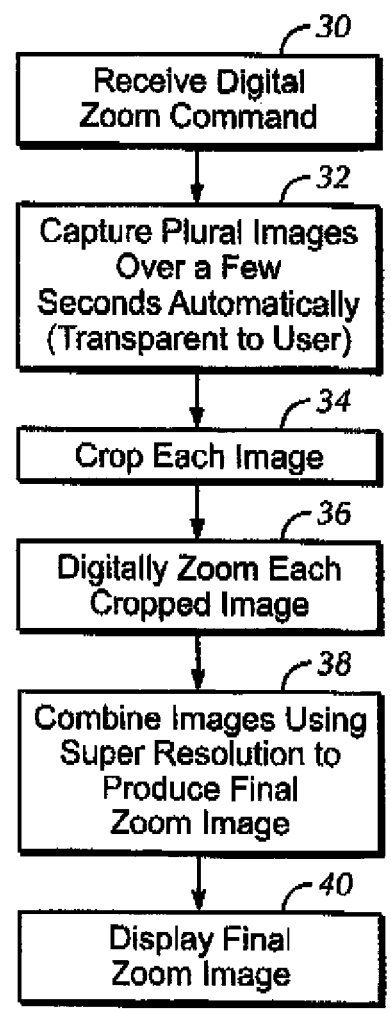
FIG. 2 is a flow chart of non-limiting logic in accordance with present principles.

Now referring to FIG. 2, at block 30 a predetermined command from the user such as a digital zoom command is received. The command may be generated by, e.g., manipulating the control 26. In response, at block 32 plural images from the imager 12 are captured automatically in quick succession, e.g., within a few seconds of receiving the command. This occurs automatically, transparently to the user.

In some embodiments a portion of each image is removed from the image to render a cropped image at block 34. The cropped images are digitally zoomed at block 36 by, e.g., expanding the remaining image pixels to fill the original image area. Then, the zoomed images are combined at block 38 by superimposing them on each other to render a modified zoomed image that has higher, resolution than any of the images from which it is derived. In one implementation, the superimposition may be done using super-resolution principles such as those disclosed in, e.g., U.S. Pat. Nos. 6,208,765 and 7,218,751, incorporated herein by reference. The modified zoomed image is presented on the display at block 40.

As understood herein, if super-resolution techniques are used that require relative motion between successive images, this requirement may be satisfied by the inevitable hand movement that occurs when a person holds a camera, which results in a sequence of images in a few seconds each of which is slightly different than the others. If motion calculation is required, motion estimation algorithms may be employed. For example, a simple algorithm might be to estimate motion using groups of pixels in each image that remain substantially unchanged in value except for their relative positions within the images, with motion vectors being derived directly from the motion of the groups of pixels from image to image. The super-imposition techniques may use Bayesian or Kalman filtering techniques in rendering the final, modified zoomed image.

The super-resolution processing may be executed in near real-time by the processor 14 as described above, or the images captured at block 32 and cropped at block 34 may be stored in the medium 16 and later downloaded to a personal computer or the like for subsequent steps to be performed off-line to render a final modified high resolution image that can then be printed or displayed on a large display such as a PC screen or TV.

While the particular SUPER-RESOLUTION DIGITAL ZOOM is herein shown and described in detail, it is to be understood that the subject matter which is encompassed by the present invention is limited only by the claims.

What is claimed is:

1. Apparatus, comprising:

an imager;

a display; and a processor configured for accessing instructions to configure the processor for combining at least two images derived from signals from the imager to render a modified digital zoom image from the at least two images, the modified zoom image having a higher resolution than at least one of the two images; and the processor when accessing the instructions being configured for sending to computer storage or to the display the modified digital zoom image, wherein the processor when executing the instructions renders the modified zoom image responsive to reception of a digital zoom command input to the apparatus.

2. Apparatus of claim 1, wherein the at least two images are superimposed using super-resolution.

3. Apparatus of claim 1, wherein the apparatus does not perform optical zooming.

4. Apparatus of claim 1, wherein the imager is a charge coupled device (CCD).

5. Apparatus of claim 1, wherein the apparatus is embodied as a wireless telephone.

6. Apparatus of claim 1, wherein the apparatus is embodied as a personal digital assistant (PDA).

* * * * *